(12) United States Patent
Spence

(10) Patent No.: US 8,776,997 B2
(45) Date of Patent: Jul. 15, 2014

(54) ADJUSTABLE CONVEYOR GUIDE

(71) Applicant: ZEPF Technologies UK Limited, Cumbernauld (GB)

(72) Inventor: Ian Steven Spence, Gartcosh (GB)

(73) Assignee: Zepf Technologies UK Limited, Cumbernauld (GB)

( * ) Notice: Subject to any disclaimer, the term of this patent is extended or adjusted under 35 U.S.C. 154(b) by 0 days.

(21) Appl. No.: 13/963,510

(22) Filed: Aug. 9, 2013

(65) Prior Publication Data
US 2014/0041993 A1 Feb. 13, 2014

(30) Foreign Application Priority Data

Aug. 13, 2012 (GB) .................................. 1214431.7

(51) Int. Cl.
*B65G 17/00* (2006.01)
*B65G 21/20* (2006.01)

(52) U.S. Cl.
CPC .................................. *B65G 21/2072* (2013.01)
USPC ....................................................... 198/836.3

(58) Field of Classification Search
CPC ........... B65G 21/2072; B65G 21/2045; B65G 37/005
USPC ........................................... 198/836.1, 836.3
See application file for complete search history.

(56) References Cited

U.S. PATENT DOCUMENTS

| | | | |
|---|---|---|---|
| 1,898,662 A | 2/1933 | Herold et al. | |
| 2,156,020 A | 4/1939 | Lathrop | |
| 2,229,605 A * | 1/1941 | Snyder et al. | 198/836.3 |
| 3,854,688 A * | 12/1974 | Shuford | 198/836.3 |
| 1,929,707 A | 10/1993 | Mojonnier | |
| 5,551,555 A * | 9/1996 | Gladieux et al. | 198/836.3 |
| 6,305,528 B1 * | 10/2001 | Leonard | 198/836.3 |
| 8,025,141 B1 * | 9/2011 | Bouldin | 198/836.3 |
| 8,132,666 B2 * | 3/2012 | McAlister et al. | 198/836.3 |
| 2008/0116042 A1 * | 5/2008 | McAlister et al. | 198/836.3 |

FOREIGN PATENT DOCUMENTS

| | | |
|---|---|---|
| CA | 2 419 173 A1 | 8/2004 |
| EP | 1 799 597 A1 | 6/2007 |
| EP | 2 361 857 A1 | 8/2011 |
| GB | 2477947 A | 8/2011 |
| WO | WO-03/042075 A1 | 5/2003 |
| WO | WO-2006/024830 A1 | 3/2006 |

OTHER PUBLICATIONS

Search Report for Great Britain Application No. 1214431.7; dated Dec. 12, 2012.
European Search Report for Application No. EP 13 18 0140 dated Oct. 30, 2013.

* cited by examiner

*Primary Examiner* — James R Bidwell
(74) *Attorney, Agent, or Firm* — Alston & Bird LLP

(57) ABSTRACT

This invention relates to conveyor guides comprising conveyor guide rail units, such as those used on automated handling lines where containers of different sizes are processed. One or more guide rails are employed to the sides of the conveyor guide to ensure that articles follow a desired path. This invention provides an adjustable conveyor guide rail unit that comprises a guide member operable to be set in a plurality of discrete positions, thereby allowing the width of a channel through which an article may be conveyed to be varied. Width adjustment is effected by adjusting a rotatable tab to align one of a number of holes with a pin provided on the guide rail. With the pin received in a hole, the guide rail is secured in a desired setting.

17 Claims, 7 Drawing Sheets

ADJUSTABLE CONVEYOR GUIDE

CROSS REFERENCE TO RELATED APPLICATION

This application claims the benefit of and priority to United Kingdom Application No. 1214431.7, filed Aug. 13, 2012, the entire contents of which are hereby incorporated by reference.

This invention relates to an adjustable conveyor guide rail unit, in particular to a conveyor guide including one or more such guide rail units that may be adjusted to define a channel with a variable width. The present invention has particular application in automated handling lines where containers, such as bottles, are processed (e.g. cleaned, filled, capped and/or labelled).

Automated handling lines usually comprise a number of machines, typically rotary handling machines, that fulfil various functions such as cleaning, assembling, filling, sealing or labelling an article. The articles are generally transported from machine to machine on automated conveyors. These conveyors typically comprise a moving floor, such as a conveyor belt.

One or more guide rails may be employed to the sides of the channel to ensure that articles follow any change in direction in the conveyor and to ensure that vibrations do not cause an article to topple. These guide rails, typically four, two to either side at different heights, form part of a pair of guide rail units with a guide rail unit being provided to either side of the channel. For long sections of conveyor path, a series of guide rail units will line each side of the channel. Conveyors often handle articles of differing sizes, for example a bottling line may handle bottles of varying sizes, both in width and height. Consequently, it is advantageous for the conveyor guide rails to be adjustable such that width of the channel may be varied to accommodate different size containers.

Historically, removable guide rail units have been used to allow guide rail units of different widths to be used interchangeably to set channels of different widths. However, this places a requirement for a range of differently-sized guide rail units to be made and also to be to hand, and the change-over operation is slow and time consuming.

Guide rail units having guide rails that may be moved between positions to set channels of different widths are known from our patent applications published as EP-A-1,799,597 and EP-A-2,361,857. These documents disclose guide rails positioned using rotatable spiders having legs of different lengths. The legs project in the direction of the width of the channel, and the ends of each spider are received within a recess provided in the guide rail. To adjust the width of the guide rail, the guide rails that are normally held in position are freed, the guide rails are slid clear of the spiders, the spiders are rotated to present a leg of different length, the guide rails are slid back to a new position such that the leg of the guide rail is received within the recess, and the guide rails are secured in position once more thereby defining a different width to the channel. The rotating spiders and their shafts are accommodated in a cut-out section provided in the guide rail that must be large enough to avoid the guide rail obstructing the spiders as they are rotated between positions. The provision of a large cut-out section potentially weakens the guide rail. In addition, there is a limit to the number of legs that may be provided by each spider, thereby limiting the number of different-size containers that may be conveyed down the channel without requiring a change of spider.

The present invention seeks to improve upon the designs of EP-A-1,799,597 and EP-A-2,361,857.

Against this background, and from a first aspect, the present invention resides in an adjustable conveyor guide rail unit adapted for use in a conveyor guide to define the side of a channel through which an article may be conveyed. The guide rail unit comprises a fixed-position support, a carriage operable to carry a guide member, and a position-setting mechanism. The position-setting mechanism comprises a shaft extending in a direction that is not parallel with a width of the channel and a rotatable part mounted on the shaft.

The carriage is coupled moveably to the fixed-position support via a position-setting mechanism, such that the carriage and hence guide member are moveable relative to the fixed-position support to allow the guide member to be placed in a plurality of discrete positions to allow the width of the channel to be varied. The position-setting mechanism is arranged to set the carriage and hence the guide member into a selected one of the plurality of discrete positions using a complementary pin and hole arrangement. The pin and hole arrangement is used to set the guide member into position by having a pin received in a hole. The pin and hole arrangement is arranged to define a plurality of pin/hole combinations that provide the plurality of discrete positions of the guide member. These combinations may be provided by a plurality of pins arranged on a variable radius relative to the shaft of the rotatable part. Alternatively or additionally, these combinations may be provided by a plurality of holes arranged on a variable radius relative to the shaft of the rotatable part. Rotation of the rotatable part about the shaft allows different pin/hole combinations to be brought into alignment. As the shaft extends in a direction not aligned with the width of the channel, and because the plurality of holes or pins are located on a variable radius relative to the shaft, each pin/hole combination sets the carriage at a different position and so sets a channel of a different width.

The pin and hole arrangement may be arranged according to a number of options. For example, the pin and hole arrangement may be provided by the rotatable part and the carriage. To allow movement of the carriage relative to the fixed-position support, the position-setting mechanism is mounted to the fixed-position support. Alternatively, the pin and hole arrangement may be provided by the rotatable part and the fixed-position support, in which case the position-setting mechanism may be mounted to the carriage to ensure the carriage moves relative to the fixed-position support.

To allow the pin and hole arrangement to function, i.e. so that pins and holes may be moved into and out of engagement to allow new pin/hole combinations to be aligned, the rotatable part is movably mounted on the shaft. This is done in a way that allows the rotatable part to be moved along the shaft between a closed position and an open position. In the closed position a pin is received within a hole thereby setting a position for the guide member. In the open position there is no engagement between a pin and a hole thereby allowing the carriage to move relative to the fixed-position support.

The carriage and guide member may be connected in any way that allows the guide member to move with the carriage. The guide member may be integrally formed with the carriage, for example the guide member may be formed by an edge of the carriage. Alternatively, the guide member may be a separate part to the carriage may be connected to the carriage through an intermediary such as a rigid support.

As will be appreciated, there are many different configurations of pin, hole, rotatable part, carriage and fixed-position support. For example, it is not critical to the invention whether or not there is a pin and a plurality of holes, whether there is a hole and a plurality of pins or whether there is a plurality of pins and a plurality of holes. There is flexibility in the choice of which components are used to provide the pin(s) and hole(s). One part of the pin and hole arrangement is provided by the position-setting mechanism, and it does not matter whether the position-setting mechanism is mounted on the carriage or the fixed-position support: once one of these options is chosen for mounting the position-setting mechanism, the other option is chosen to provide the other part of the pin and hole arrangement. The following arrangements are preferred:

1. A pin provided on the position-setting mechanism, holes provided on the carriage, and the position-setting mechanism mounted to the fixed-position support.

2. Pins provided on the position-setting mechanism, and a hole provided on the carriage, and the position-setting mechanism mounted to the fixed-position support.

3. A hole provided on the position-setting mechanism, pins provided on the carriage, and the position-setting mechanism mounted to the fixed-position support.

4. Holes provided on the position-setting mechanism, and a pin provided on the carriage, and the position-setting mechanism mounted to the fixed-position support.

5. A pin provided on the position-setting mechanism, holes provided on the fixed-position support, and the position-setting mechanism mounted to the carriage.

6. Pins provided on the position-setting mechanism, and a hole provided on the fixed-position support, and the position-setting mechanism mounted to the carriage.

7. A hole provided on the position-setting mechanism, pins provided on the fixed-position support, and the position-setting mechanism mounted to the carriage.

8. Holes provided on the position-setting mechanism, and a pin provided on the fixed-position support, and the position-setting mechanism mounted to the carriage.

Such guide rail units are advantageous as they allow the width of the channel to be varied without requiring the time-consuming removal of parts, followed by replacement with other parts. Moreover, the provision of discrete positions allows a simple and quick to operate mechanism to be employed. By discrete positions, it is meant that a plurality of predetermined positions are available to be selected by a user. This is in contrast to the often more complex mechanisms employed in the prior art that allow a user to set any position within a range but that are time-consuming to operate.

Guide rail units according to the present invention provide a simple way of changing the width of the channel. To adjust the channel width to handle an article of different width, an operator need only move the rotatable part along the shaft from the closed position to the open position, rotate the rotatable part and move the carriage such that a new pin/hole combination move into alignment, and move the rotatable part back along the shaft from the open position to the closed position thereby setting the guide member in position.

Optionally, where the pin and hole arrangement comprises a pin and a plurality of holes arranged on a variable radius relative to the shaft, the holes may be located adjacent to and extending to meet a channel whose length extends along the variable radius thereby linking the holes. Then, the closed position of the rotatable part may correspond to the pin extending through the channel and being received in one of the holes. The open position of the rotatable part may correspond to the pin being displaced from the hole but still received within the channel. With such an arrangement, rotation of the rotatable part advantageously moves the pin along the channel from one hole to another hole. As the channel extends along the variable radius, this rotation sees the pin push against the edge of the channel and so drives movement of the carriage to set the guide member in a new position. To aid smooth operation, the width of the pin, the holes and the channel may be substantially the same.

Where the pin and hole arrangement is provided by the rotatable part and the fixed-position support, and the position-setting mechanism is mounted to the carriage, the pin may extend from the fixed-position support through a slot provided in the carriage that extends in the same direction as the width of the channel. This slot allows the carriage to move relative to the shaft that is fixed in position. The slot also helps guide movement of the carriage and guide member in the direction of the width of the channel.

The rotatable part may be removably mounted on the shaft. This allows replacement of the rotatable part, for example as part of refurbishment or to allow another rotatable part to be used that has different pin/hole positions that set a different range of guide member positions.

Optionally, the shaft comprises two narrowed portions and the rotatable part comprises a movable projection operable to be moved between positions where the projection does and does not project into one of the narrowed portions. The movable projection may be set in the closed position with the movable projection projecting into one of the narrowed portions. The movable projection may then be withdrawn from the narrowed portion such that the rotatable part may be moved along the shaft and then set in the open position in which the projection projects into the other narrowed portion.

The movable projection may be spring-loaded, for example a spring-loaded grub screw, so as to be easy to move between open and closed positions. Such an arrangement offers a resistance when being moved out of the closed position that is relatively easy to overcome, and also provided appositive action to locate the movable projection into a narrowed portion to set the closed position.

Thus, the rotatable part may be supported in the open and closed positions, helping to guide the rotation (for example, the narrowed portions may extend all the way around the periphery of a cylindrical shaft). In addition, the narrowed portion used to set the open position may be used to ensure that the correct withdrawal of a pin is achieved, for example to ensure the pin is withdrawn fully from a hole but remains within the channel. As will be appreciated, the movement described above may be reversed to move the rotatable part from open to the closed position.

The rotatable part may be provided with a handle that, when actuated, causes the movable projection to move into and out of one the narrowed portions. The rotatable part may be arranged such that rotation of the handle causes rotation of the rotatable part about the shaft. This is convenient as it allows adjustment to be effected with just one hand and without the need to remove the hand from the handle: the handle may be grasped, moved along the shaft to change from closed to open positions and then rotated to bring a new pin/hole combination into alignment, before finally being moved back along the shaft to set the closed position.

The fixed-position support and carriage may further comprise a post and slot arrangement wherein a post is received a slot that extends in the same direction as the width of the channel. This constrains movement of the guide member to allow effective changing of the width of the channel.

Preferably, the guide rail unit further comprises a second position-setting mechanism like the first position-setting mechanism. This is advantageous as it provides two points of contact that support the guide member in position, thereby providing more accurate positioning.

Preferably, the guide rail unit further comprises a second guide member supported above the first guide member. Advantageously, this allows articles to be supported at two different heights thereby reducing the likelihood of an article toppling over. The second guide member need not be directly above the first. For example, the second guide member may be set inwardly of the first to project further into the channel. This may be advantageous (particularly when used in conjunction with a second like guide rail unit that faces the first across the channel) for example, when bottles with slender necks are being conveyed: the first guide member may be set to support the wide body of the bottle, whereas the second may be set to support the narrower neck of the bottle. Providing guide members of different widths would allow this whilst still conveniently allowing them to be mounted to supports provided by the lower guide member. The further guide member may be supported by the carriage so as to move with the carriage.

Optionally, the further guide member is adapted to be supported at a plurality of discrete heights above the guide member. The further guide member may be supported on a stem having a plurality of narrowed portions and the further guide member may contain moveable parts arranged to be received within the narrowed portions thereby defining a plurality of mounting positions of the further guide member at different heights. This corresponds to a simple arrangement that allows rapid adjustment of the height of the further guide member. Any number of narrowed portions may be provided on each of the at least one supports.

The invention also extends to a conveyor guide including one or more such guide rail units. For example, the conveyor guide may comprise a channel through which articles may be conveyed, wherein a first side of the channel is defined at least in part by a plurality of any of the guide rail units described above. Advantageously, an adjacent pair of the plurality of guide rail units may be coupled together.

Optionally, the guide members of the adjacent pair of guide rail units are coupled together such that movement of one guide member causes a corresponding movement of the other guide member. Either alternatively or additionally, the further guide members of the adjacent pair of guide rail units may be coupled together such that movement of one further guide member causes a corresponding movement of the other further guide member. Either of these arrangements are convenient in that moving the guide member or the further guide member ensures that adjacent guide members move in unison. Thus, setting the position of one guide member automatically sets the position of all other guide members.

When using adjacent, coupled guide rail units, it may be preferable for each of the plurality of guide rail units to have only one position-setting mechanism. This is because positioning and guidance of the guide members as they move may be performed by the collective action of the plurality of position-setting mechanisms.

From a second aspect, the present invention resides in a method of adjusting any of the adjustable conveyor guide rail units described above. The method comprises moving the rotatable part along the shaft from the closed position to the open position, rotating the rotatable part and moving the carriage such that a new pin/hole combination move into alignment, and moving the rotatable part back along the shaft from the open position to the closed position thereby setting the guide member in position.

In order that the invention can be more readily understood, reference will now be made by way of example only, to the accompanying drawings in which.

Figure 4:
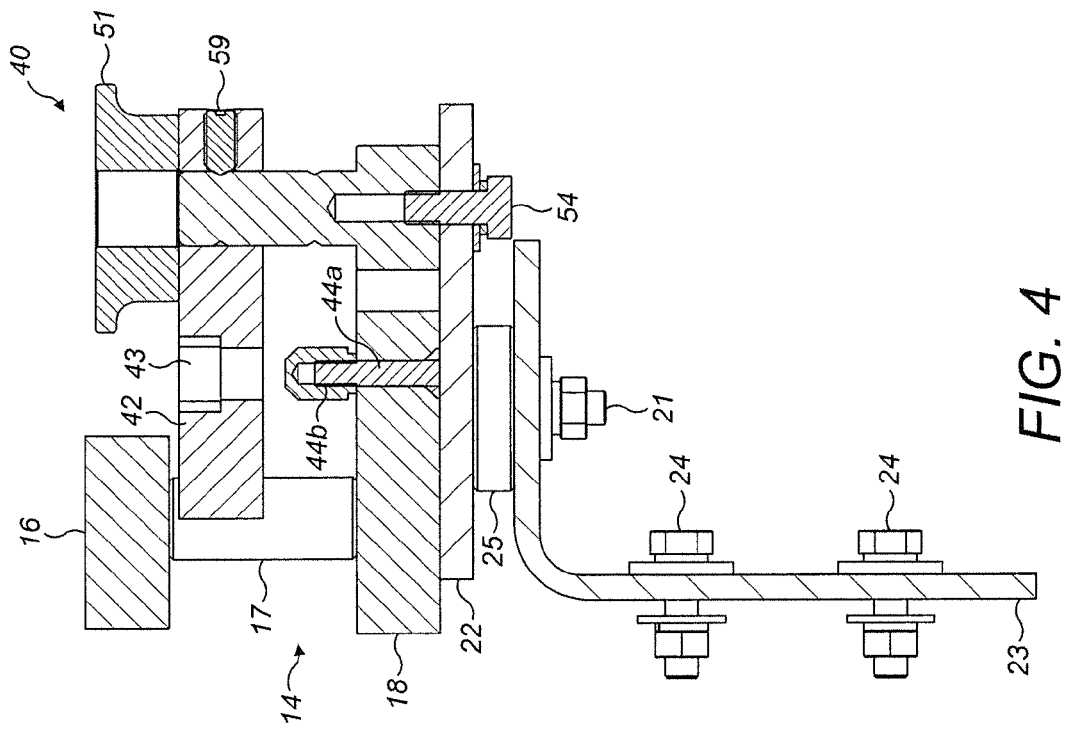
Figure 3:
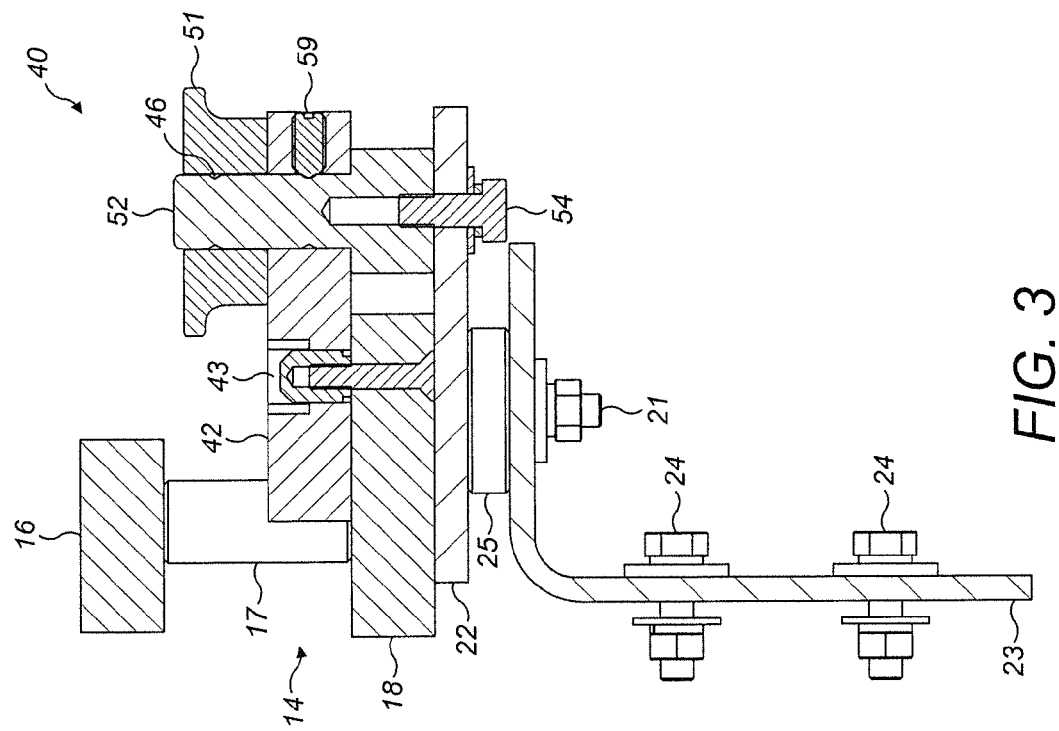
FIG. 3 is a transverse section along line X-X of FIG. 2 that shows the upper and lower guide rails locked into position.
Figure 6:
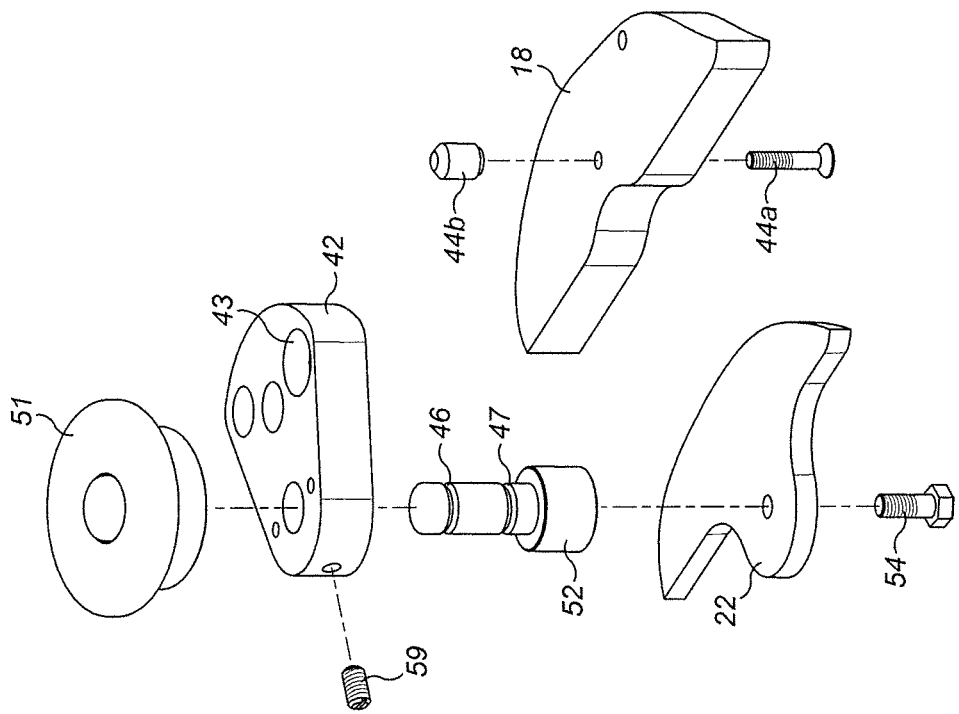
Figure 5:
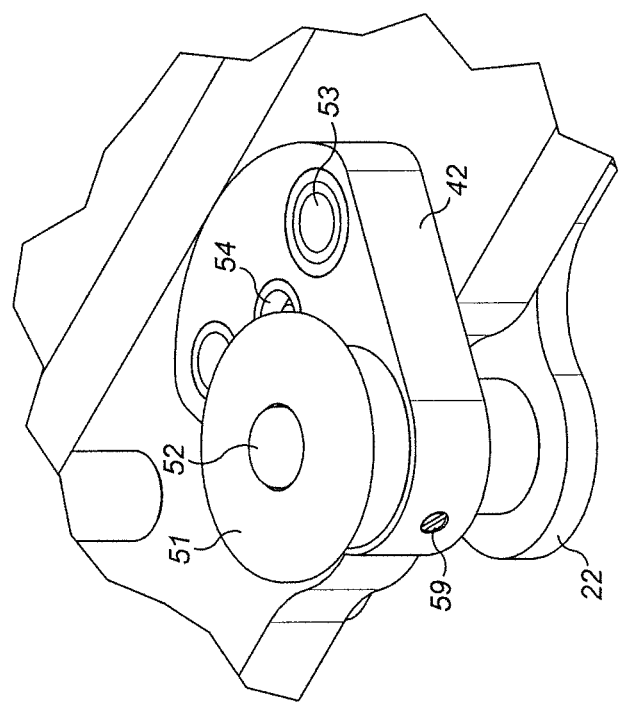
Figure 8:
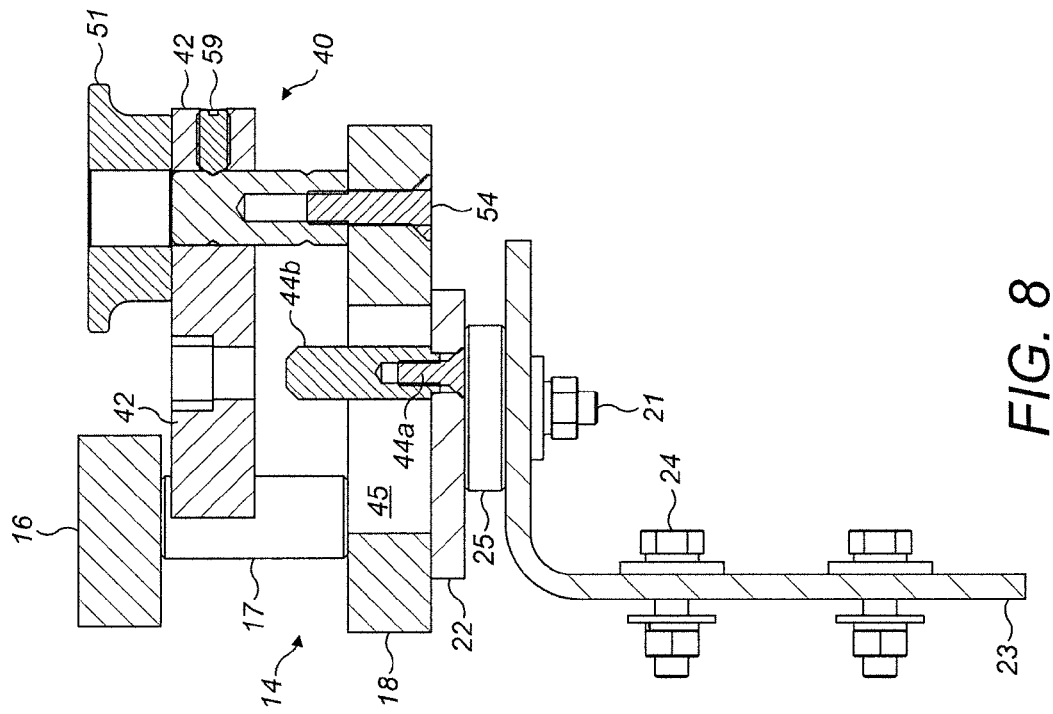
Figure 7:
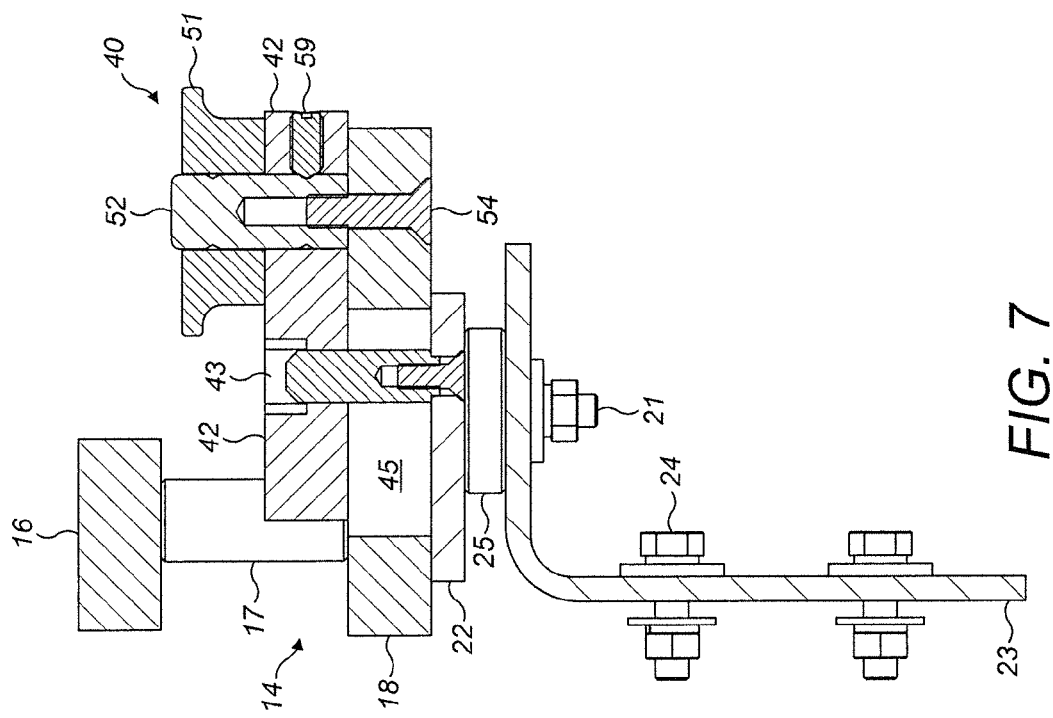
Figure 9:
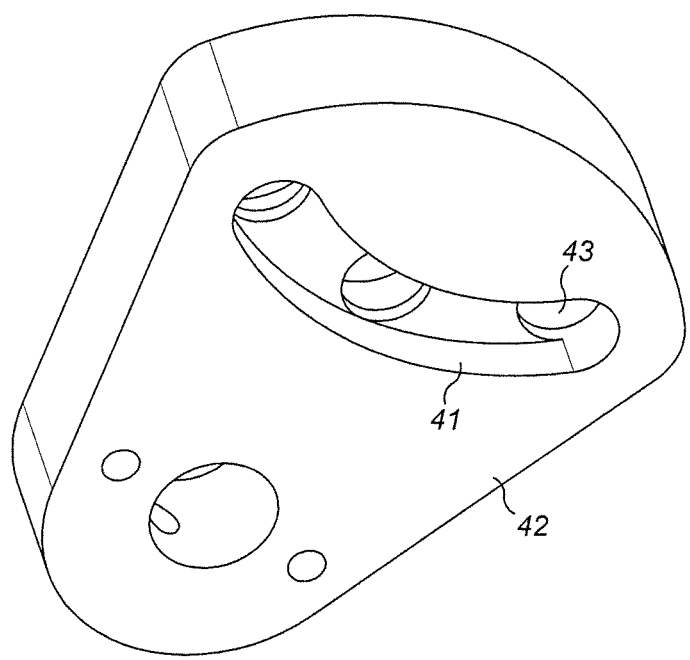
Figure 11:
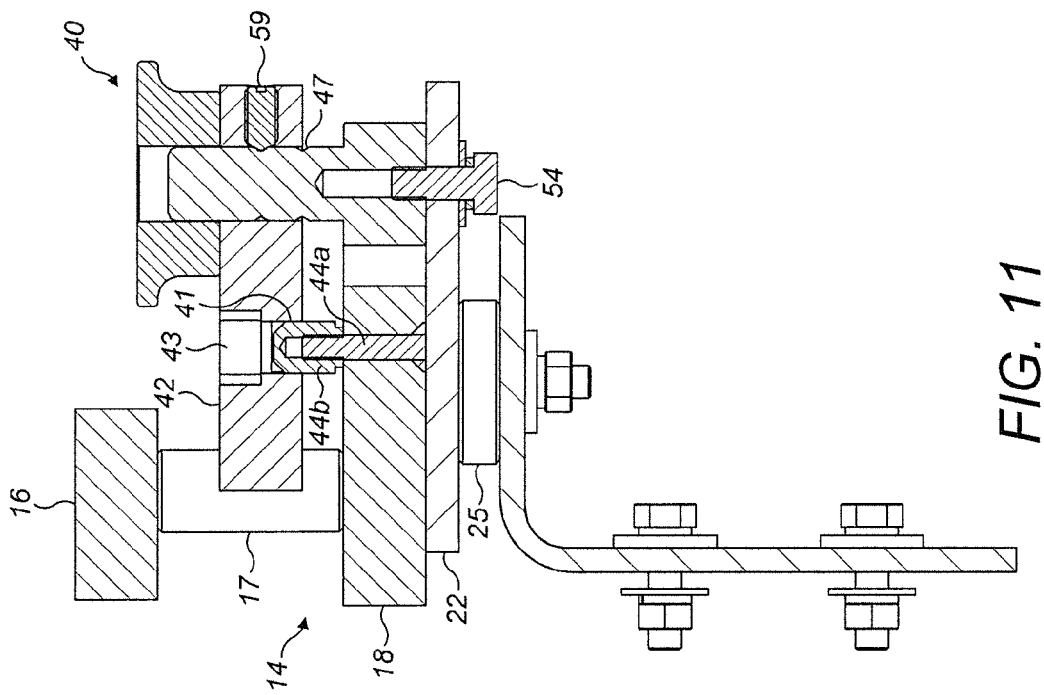
Figure 10:
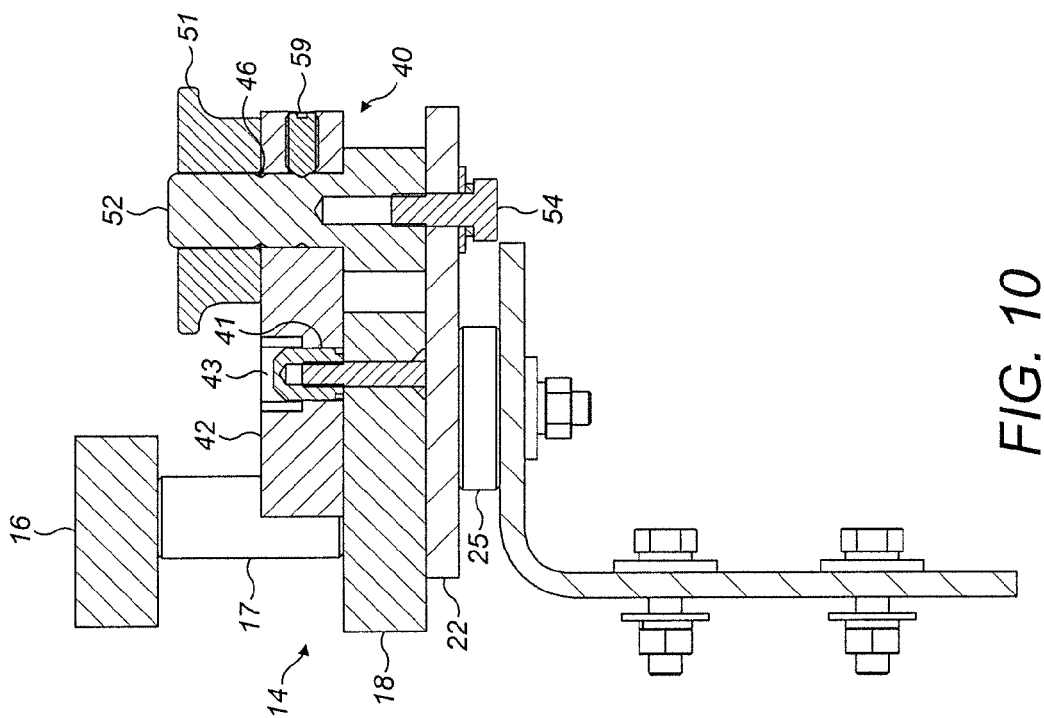

FIG. 4 corresponds to FIG. 3, but shows the upper and lower guide rails unlocked ready for setting into a new position;

FIG. 5 is a detail of an adjuster of FIGS. 1 to 4;

FIG. 6 is an exploded view of the adjuster and parts of the core plate and lower guide rail of FIGS. 1 to 4;

FIGS. 7 and 8 correspond to FIGS. 3 and 4 that show an adjustable guide rail unit according to the further embodiment of the present invention;

FIG. 9 is an underside perspective view of a tab used in an adjustable guide rail unit according to a still further embodiment of the present invention; and FIGS. 10 and 11 correspond to FIGS. 3 and 4 that show an adjustable guide rail unit according to the still further embodiment of the present invention that includes the tab of FIG. 9.

Figure 1:
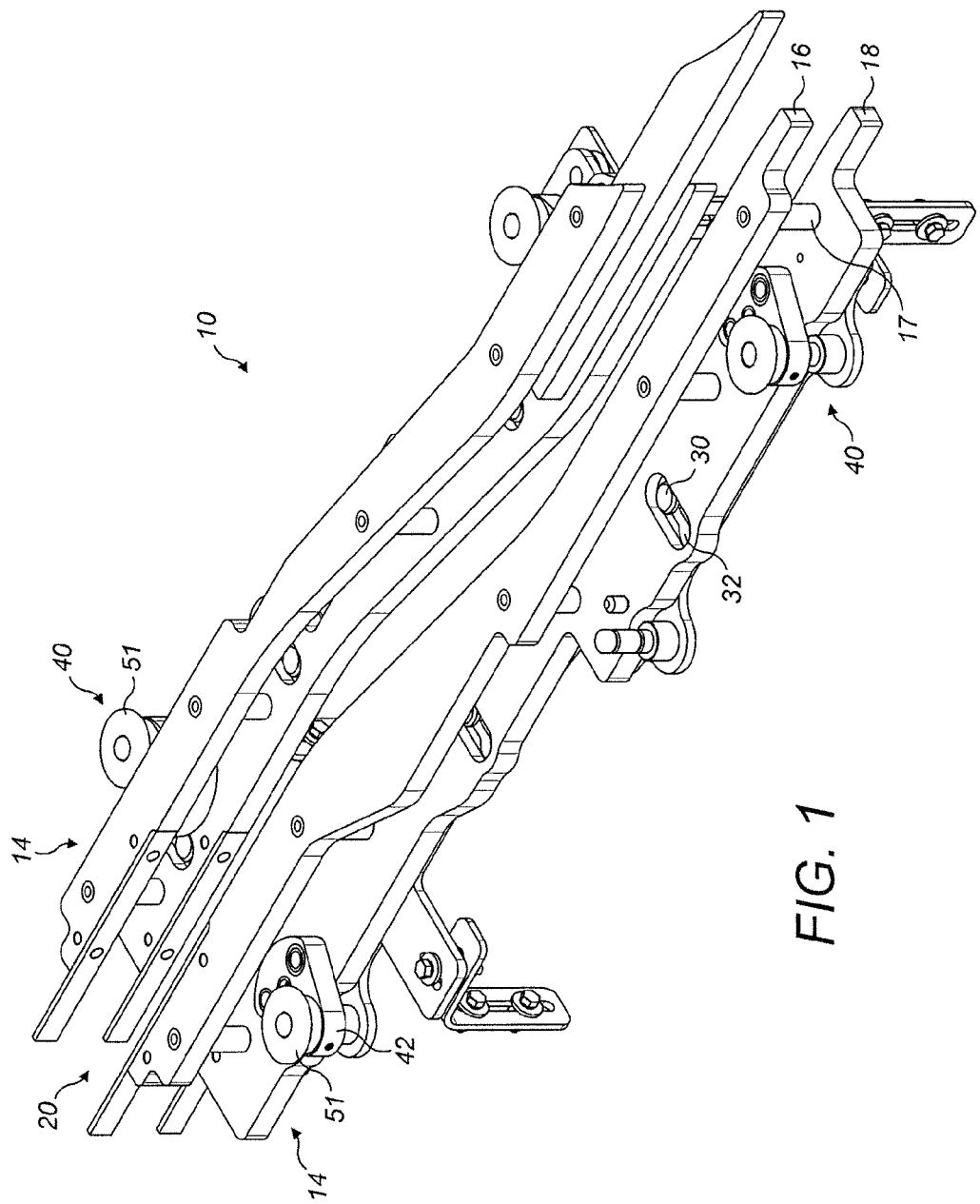
FIG. 1 is a perspective view of a conveyor guide according to an embodiment of the present invention from above and to one side.
Figure 2:
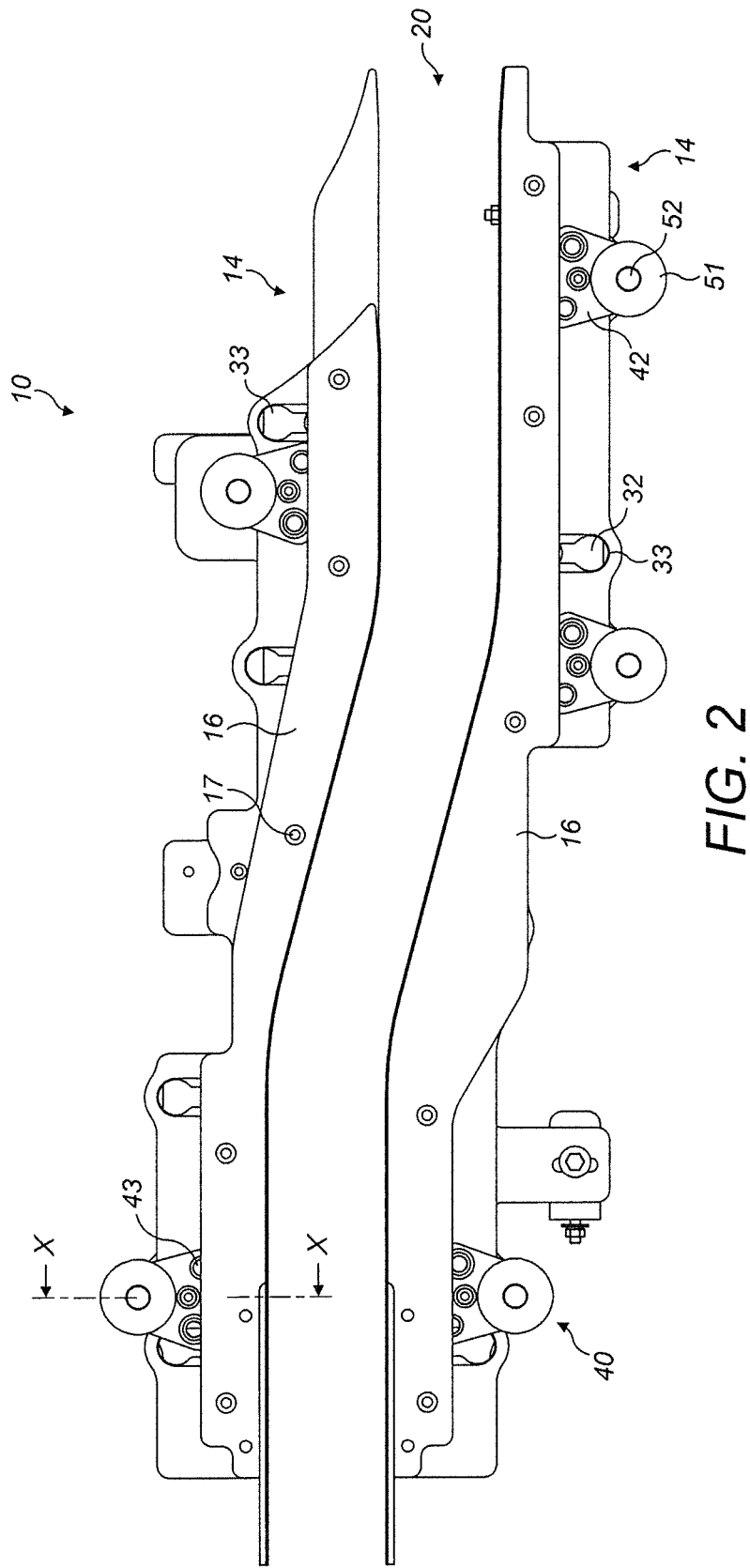
FIG. 2 is a plan view of the conveyor guide of FIG. 1.

A conveyor guide 10 is shown in FIGS. 1 and 2 that comprises a pair of opposed guide rail units 14 that together define a channel 20 through which articles are conveyed. One of the guide rail units 14 is shown in cross-section in FIGS. 3 and 4.

Each guide rail unit 14 is mounted to a base structure that is not shown in the figures for the sake of clarity. A conveyor, such as a belt conveyor, is included at the base of the channel 20 and is operable to convey containers along the channel 20, although this too is omitted from the figures for the sake of clarity. Many possible arrangements of base structure and conveyor will be apparent to the person skilled in the art.

In normal use, guide rail units 14 are likely to be mounted in opposed fashion to define a channel therebetween. The conveyor guide 10 may define a short channel 20, although the channel 20 could be of any length and could define a curved or kinked path. Guide rail units 14 may be placed in series to define longer channels 20, or channels 20 with more complex shapes. Adjacent guide rail units 14 may be coupled together, for example as described in EP-A-2,361,857.

Each guide rail unit 14 comprises a pair of vertically-separated guide members, namely an upper guide rail 16 and a lower guide rail 18. The guide rails 16, 18 are plate-like and define the channel 20 that extends along the length of the conveyor guide 10. The upper guide rails 16 face each other at the same level across the channel, as too do the lower guide rails 18. The edges of the guide rails 16, 18 are the guide members that provide contact surfaces to support an article conveyed through the channel 20.

Each guide rail unit 14 is attached to the base structure with an angled bracket 23 and a pair of nuts and bolts 24. The angled bracket 23 joins to a fixed-position support corresponding to a core plate 22. A spacer 25 separates the core plate 22 from the angled bracket 23, with the core plate 22 being secured to the angled bracket 23 by a screw 21.

In the embodiment of FIGS. 1 to 4, the lower guide rail 18 couples to the core plate 22 such that the lower guide rail 18 can slide laterally relative to the core plate 22 to define a varying width of the channel 20. This lateral movement is constrained by three complementary slot and post arrangements, each comprising a post 30 of circular cross-section received within a slot 32 elongated in a lateral direction. Each post 30 has an enlarged head that is accommodated in a widened top half of each slot 32. This arrangement ensures that the lower guide rail 18 can slide across the core plate 22, but cannot lift up from the core plate 22, except for when moved fully inwardly such that a large aperture 33 of the slot 32 aligns with the post 30, the large aperture 33 being sized to be slightly larger than the post 30.

As can be seen, the lower guide rail 18 moves as a single piece, such that the lower guide rail 18 fulfils the roles of both a guide member for guiding the containers and also a carriage for moving the guide member.

The upper guide rail 16 is held in position above the lower guide rail 18 by a series of pillars 17 that extend from the lower guide rail 18 to the upper guide rail 16. The pillars 17 are of a common length such that the guide rails 16, 18 have a fixed separation. As the guide rails 16, 18 are rigidly coupled to each other, the upper guide rail 16 moves in unison with the lower guide rail 18.

The position of the lower guide rail 18, and hence the upper guide rail 16 and the width of the channel 20, is easily set in one of three indexed positions as follows.

Three position-setting mechanisms comprising adjusters 40 are provided for each lower guide rail 18. The adjusters 40 are shown in greater detail in FIGS. 5 and 6. Each adjuster 40 comprises a rotatable part in the form of a tab 42 rotatably mounted on a shaft 52. The shaft 52 is held in position by a screw 54 that projects through the core plate 22. Movement of the tabs 42 is aided by a handle 51 provided on the top of, and rigidly fastened to, each tab 42. The handle 51 is shaped such that it is easily gripped by a user adjusting the width of the channel 20.

Each tab 42 is also provided with a spring detent grub screw 59 that has a rounded tip that projects into upper and lower ring-shaped grooves, 46 and 47 respectively, that are provided around the shaft 52. To move the tabs 42 up and down the shaft 52, some force is required to overcome the spring of the grub screw 59, but the tabs 42 may then be moved to the next groove 46, 47. Resistance will be felt when each tab 42 reaches the next position as the rounded tip of the grub screw 59 is received in the next groove 46, 47, thus providing indexed positioning that corresponds to the tab 42 being at a desired height. When the grub screw 59 projects into a groove 46, 47, the tab 42 may be rotated using the handle 51, with the groove 46, 47 maintaining the desired height of the tab 42, as will be explained below.

Each tab 42 is provided with three holes 43 sized and shaped to receive a pin 44. The three holes 43 are at different distances from the shaft 52. A pin 44 is provided for each of the adjusters 40 that will be received by the holes 43. Each pin 44 projects through and is secured to the lower guide rail 18: this is achieved using a two-piece construction of the pin 44. The pin 44 comprises a pin core 44a topped by a pin cap 44b that join to fix the pin 44 in position against the lower guide rail 18.

The lower guide rail 18 is initially held in position with each pin 44 projecting into a corresponding one of the three holes 43. This closed position, in which the pin 44 is received in a hole 43, is shown in FIG. 3. As can be seen, the grub screw 59 is received in the lower groove 47 of the shaft 52.

To adjust the width of the channel 20, each adjuster 40 must be moved to an open position where the pin 44 is no longer received in a hole 43. The open position is shown in FIG. 4. To effect movement of the adjuster 40, the handle 51 is grasped with sufficient force for the grub screw 59 to move out of the lower groove 47 and the handle 51 is moved upwardly so that the tab 42 moves up the shaft 52. The spring of the grub screw 59 urges the end of the grub screw 59 into the upper groove 46, and the inherent tactile response indicates to the user that the adjuster 40 is now set in the open position.

With each adjuster 40 set to the open position with the holes 43 free of the pins 44, the lower guide rail 18 is free to be slid into the next position. To do this, the tabs 42 may be rotated with the handles 51 such that the desired hole 43 moves into the setting position. Movement of the grub screw 59 out of the upper groove 46 will be resisted, thereby retaining the tab 42 at the correct height of the open position. The lower guide rail 18 may then be slid laterally until the pin 44 is seen to align with the desired hole 43. The slot and post arrangements 30, 32 constrain the lower guide rail 18 to move laterally in and out of the channel 20 during movement of the guide rail 18.

With the pin 44 and desired hole 43 aligned, the tab 42 may be moved down the shaft 52 using the handle 51. That is, the user may push down on the handle 51 such that the grub screw 59 is released from the upper groove 46. The tab 42 will then slide down the shaft 52 such that the pin 44 is received within the hole 43. The grub screw 59 then enters the lower groove 47, setting the adjuster 20 in its closed position and thereby fixing the lower guide rail 18 into position. Selection of one of the three holes 43 allows three different positions of the guide rails 16, 18 to be selected. Providing the three holes 43 with different separations from the shaft 52 ensures that channels 20 of varying widths are formed.

If more than three widths are required, further holes 43 may be provided on each tab 42. For a still further range of widths, interchangeable tabs 42 may be provided, each tab 42 having a different range of hole positions. Each tab 42 and handle 51 combination may be pulled from each shaft 52, and replaced with an alternative tab 42 and handle 51 combination.

As will be appreciated from the above, the lateral position of the upper guide rail 16 is adjusted in unison with the lateral position of the lower guide rail 18. Vertical adjustment of the upper guide rail 16 may be provided as well, for example using the slotted pillar arrangement described in EP-A-1,799, 597.

In the embodiment of FIGS. 1 to 6, the tabs 42 are provided with holes 43 and the lower guide rail 18 is provided with pins 44. This arrangement may be varied. For example, lower guide rail 18 may be provided with sets of three pins 44, and each tab 42 may be narrowed and provided with a single hole 43 such that it may be placed on any of the pins 44. Alternatively, the tab 42 may be provided with one or more downwardly-projecting pins 44 and the lower guide rail 18 may be provided with one or more holes 43 for each adjuster 40.

Furthermore, the adjusters 40 are mounted to the core plate 22 in the embodiment of FIGS. 1 to 6 such that the adjusters 40 are fixed in a lateral position. However, the adjusters 40 may be fixed to the lower guide rail 18 such that the adjusters 40 move laterally with the lower guide rail 18. Such an arrangement is shown in FIGS. 7 and 8.

The embodiment of FIGS. 7 and 8 shows only some variation to the embodiment of FIGS. 1 to 6. For the sake of brevity, the following description focuses on the differences between the embodiments. Moreover, common parts are identified by common reference numerals.

As can be seen in FIGS. 7 and 8, the adjusters 40 are mounted to the lower guide rail 18. That is, pin 54 extends through and is secured to lower guide rail 18 such that shaft 52 extends from lower guide rail 18. The tab 42 and handle 51 are mounted on the shaft 52 in the same way, such that the tab 42 and handle 51 move with the lower guide rail 18 as it slides laterally. In fact, the handle 51 may be conveniently used to slide the lower guide rail 18 between positions.

The same arrangement of holes 43 are provided by the tab 42, and they co-operate with a similar pin 44. However, pin 44 must now be fixed in position relative to the holes 43 that slide laterally with the lower guide rail 18. Pin 44 is secured to the core plate 22 and extends through a laterally-extending slot 45 provided in the lower guide rail 18: this slot 45 allows the lower guide rail 18 to move relative to the fixed-position pin 44. The slot 45 and pin 44 arrangements may take the place of the post and slot arrangements 30, 32 of the embodiment of FIGS. 1 to 6 as they will perform the same function.

To adjust the width of the channel 20, the adjusters 20 are moved from the closed position shown in FIG. 7 to the open position shown in FIG. 8 in the same way as described previously. That is, the handles 51 are pulled upwardly. Then, the handles 51 need not be released but may be rotated and translated to move the guide rails 16, 18 to the new position such that the pin 44 aligns with a new hole 43. Then, the handles 51 may be used to push the tabs 42 down to the closed position where the pin 44 is received in the selected hole 43.

To allow ease of operation for a user, the embodiment of FIGS. 7 and 8 may see each guide rail unit 14 provided with just two adjusters 40, rather than the three adjusters 40 of FIGS. 1 to 6. As will be appreciated, a user may then use one hand for each adjuster 40 and so set a new position of the guide rails 16, 18 in one easy operation.

A further embodiment is shown in FIGS. 9 to 11. This further embodiment shows only some variation to the embodiment of FIGS. 1 to 8. For the sake of brevity, the following description focuses on the differences between the embodiments, and common parts are identified by common reference numerals. The embodiment of FIGS. 9 to 11 has a modified tab 42 that advantageously assists in alignment of the pin 44 with the holes 43 and that drives the guide rails 16, 18 between positions.

As best seen in FIG. 9, the tab 42 is provided with three holes 43 positioned on a variable radius with respect to the shaft 52. The holes 43 extend through only the top half of the tab 42. However, the bottom of each hole 43 meets a channel 41 that extends along the variable radius linking the holes 43, and is of a depth to occupy the bottom half of the tab 42.

When the adjuster 40 is in the closed position, as shown in FIG. 10, the pin 44 extends through both a hole 43 and the channel 41. Thus, the lower guide rail 18 is held in position as the pin 54 cannot move from the hole 43. In the closed position, the grub screw 59 extends into the lower groove 47.

FIG. 11 shows the open position in which the tab 42 is raised and the grub screw 59 extends into the upper groove 46. In the open position, the pin 44 extends into the channel 41 but is clear of the holes 43. As the handle 51 is rotated, the cap 44b of the pin 44 moves along the channel 51. As the shaft 52 is fixed in position, the channel 51 drives the pin 44 and hence also drives the lower guide rail 18 to which the pin 44 is secured. Hence, a user may merely rotate the handle 51 such that a new hole 43 is brought into alignment with the pin 44, and this movement necessarily drives the guide rails 16, 18 into the desired position. The handles 51 may then be pushed down such that the pin 44 moves into the new hole 43 and the adjuster 20 is returned to the closed position of FIG. 10.

The reduced movement of the tab 42 along the shaft 52 means that the upper and lower grooves 46, 47 have a reduced separation when compared to the embodiments of FIGS. 1 to 8. It will also be appreciated that the tab 42 may be provided with the pin 44, and the lower guide rail 18 may be provided with a similar hole 43 and channel 41 arrangement, albeit with the channel 41 now positioned above the holes 43.

To allow ease of operation for a user, the embodiment of FIGS. 9 to 11 may see each guide rail unit 14 provided with just two adjusters 40, rather than the three adjusters 40 of FIGS. 1 to 6. As will be appreciated, a user may then use one hand for each adjuster 40 and so set a new position of the guide rails 16, 18 in one easy operation.

A skilled person will appreciate that the above embodiments may be varied in many different respects without departing from the scope of the present invention.

The channel 20 may be defined by one or more guide rail units 14. For example, a single guide rail unit 14 akin to one of those shown in the Figures may define one side of a channel 20 whereas the other side of the channel 20 may be defined by a feed screw that is rotated to move containers along the conveyor guide 10.

Not all guide rail units 14 need be adjustable. For example, only one side of a channel 20 need be provided with a width-adjustable guide rail unit 14 to allow variation of the width of the channel 20. However, it is preferred to provide width-adjustable guide rail units 14 on both sides of the channel 20 because this allows the width of the channel 20 to be adjusted while preserving the position of its centre line. A guide rail unit 14 within a conveyor guide 10 may be width-adjustable and a conveyor guide 10 may comprise any combination of such guide rail units 14 and also further include non-adjustable guide rail units 14.

The conveyor guide 10 may define a straight channel 20, a curved channel 20 or a kinked channel 20. The dimensions of the conveyor guide 10 may be freely varied to suit needs. A currently preferred application is for use in an automated bottling line, where bottles with capacities from, for example, 250 ml to 2 l may be conveyed.

How the articles are to be conveyed is also a matter of choice. The articles may be conveyed through the conveyor guide 10 by a belt that supports the articles from below, by a carrier that grips the articles from above (e.g. that grips the necks of bottles), or by rotating rollers disposed periodically along a conveyor guide 10 or a feed screw that imparts motion to articles that contact them as they pass by.

The embodiments shown in the Figures comprise four guide rails 16, 18 to define the channel 20, with each opposed pair being at a common height. Other numbers of guide rails 16, 18 may be used to define the channel 20, e.g. 3, 5, 6, etc., and pairs of opposed guide rails 16, 18 need not be positioned at different heights. Of course, each guide rail unit 14 need not carry the same number of guide rails 16, 18. The height of each guide rail 16, 18 may be freely chosen.

The guide rails 16, 18 shown in the accompanying Figures are thin with little depth. However, the depth of the guide rails 16, 18 may be freely chosen. For example, each guide rail unit 14 may carry a single deep guide rail 16, 18 for supporting a straight-sided bottle or the like. The widths of the guide rails 16, 18 may also be varied. This would allow the width of the channel 20 to vary with height, e.g. it may be narrower at the top to correspond to the narrowest neck of a bottle.

Whilst tabs 42 with three holes 43 are shown in the Figures, the number of holes 43 may be freely chosen and arranged as desired, as described above. Also, the number of adjusters 40 per guide rail unit 14 may be varied.

The invention claimed is:

1. An adjustable conveyor guide rail unit adapted for use in a conveyor guide to define the side of a channel through which an article may be conveyed, the guide rail unit comprising:
   a fixed-position support;
   a carriage operable to carry a guide member; and
   a position-setting mechanism comprising a shaft extending in a direction that is not parallel with a width of the channel and a rotatable part mounted on the shaft;
   wherein:
   the carriage is coupled moveably to the fixed-position support via a position-setting mechanism, such that the carriage and hence guide member are moveable relative to the fixed-position support to allow the guide member to be placed in a plurality of discrete positions to allow the width of the channel to be varied;

the position-setting mechanism is arranged to set the carriage and hence the guide member into a selected one of the plurality of discrete positions using a complementary pin and hole arrangement where a pin is received in a hole, the pin and hole arrangement defining a plurality of pin/hole combinations to provide the plurality of discrete positions of the guide member, such that the plurality of pin/hole combinations are provided by a plurality of pins arranged on a variable radius relative to the shaft of the rotatable part and/or a plurality of holes arranged on a variable radius relative to the shaft of the rotatable part thereby ensuring that rotation of the rotatable part about the shaft allows different pin/hole combinations to be brought into alignment, and wherein either the pin and hole arrangement is provided by the rotatable part and the carriage, and the position-setting mechanism is mounted to the fixed-position support or the pin and hole arrangement is provided by the rotatable part and the fixed-position support, and the position-setting mechanism is mounted to the carriage;

and wherein the rotatable part is movably mounted on the shaft such that the rotatable part may be moved along the shaft from a closed position in which a pin is received within a hole thereby setting a position of the guide member, to an open position in which there is no engagement between a pin and a hole thereby allowing the carriage to move relative to the fixed-position support.

2. The guide rail unit of claim 1, wherein:
the pin and hole arrangement comprises a single pin and a plurality of holes arranged on a variable radius relative to the shaft.

3. The guide rail unit of claim 2, wherein:
the pin and hole arrangement is provided by the rotatable part and the carriage, and the position-setting mechanism is mounted to the fixed-position support.

4. The guide rail unit of claim 2, wherein:
the holes are located adjacent a channel extending along the variable radius thereby linking the holes; and
the closed position of the rotatable part corresponds to the pin extending through the channel and being received in one of the holes, and the open position of the rotatable part corresponds to the pin being displaced from the holes but received within the channel such that rotation of the rotatable part drives the pin along the channel from one hole to another hole while effecting movement of the carriage.

5. The guide rail unit of claim 2, wherein:
the pin and hole arrangement is provided by the rotatable part and the fixed-position support, and the position-setting mechanism is mounted to the carriage; and
the pin extends from the fixed-position support through a slot provided in the carriage that extends in the same direction as the width of the channel.

6. The guide rail unit of claim 1, wherein:
the rotatable part is removably mounted on the shaft.

7. The guide rail unit of claim 1, wherein:
the shaft comprises two narrowed portions and the rotatable part comprises a movable projection operable to be moved between positions where the projection does and does not project into one of the narrowed portions,
such that the rotatable projection may be set in the closed position with the movable projection projecting into one of the narrowed portions, the movable projection may then be withdrawn from the narrowed portion such that the rotatable part may be moved along the shaft and then set in the open position in which the projection projects into the other narrowed portion.

8. The guide rail unit of claim 7, wherein:
the rotatable part is provided with a handle that, when actuated, causes the movable projection to move into and out of one the narrowed portions.

9. The guide rail unit of claim 8, wherein:
the rotatable part is arranged such that rotation of the handle causes rotation of the rotatable part about the shaft.

10. The guide rail unit of claim 1, wherein:
the fixed-position support and carriage further comprise a post and slot arrangement wherein a post is received a slot that extends in the same direction as the width of the channel thereby guiding movement of the carriage to be in the direction of the width of the channel.

11. The guide rail unit of claim 1, further comprising a second position-setting mechanism like the first position-setting mechanism.

12. The guide rail unit of claim 1, further comprising a further guide member supported above the guide member.

13. The guide rail unit of claim 12, wherein the further guide member is supported by the carriage so as to move with the carriage and the guide member.

14. The guide rail unit of claim 13, wherein the further guide member is adapted to be supported at a plurality of discrete heights above the guide member.

15. A conveyor guide including the conveyor guide rail unit of claim 1.

16. A conveyor guide comprising a channel through which articles may be conveyed, a first side of the channel being defined at least in part by a guide rail unit according to claim 1, and a second side of the channel being defined at least in part by a further guide rail unit according to claim 1.

17. A method of adjusting the adjustable conveyor guide rail unit of claim 1, comprising:
moving the rotatable part along the shaft from the closed position to the open position;
rotating the rotatable part and moving the carriage such that a new pin/hole combination move into alignment; and
moving the rotatable part back along the shaft from the open position to the closed position thereby setting the guide member in position.

* * * * *